United States Patent [19]

Nakagawa

[11] Patent Number: 5,247,293

[45] Date of Patent: Sep. 21, 1993

[54] SIGNAL REPRODUCING APPARATUS

[75] Inventor: Noboru Nakagawa, Tokyo, Japan

[73] Assignee: Sony Corporation, Tokyo, Japan

[21] Appl. No.: 696,963

[22] Filed: May 8, 1991

[30] Foreign Application Priority Data

May 11, 1990 [JP] Japan .................................. 2-122007

[51] Int. Cl.$^5$ .......................... H04Q 3/00; H04B 1/00; G11B 19/00; G11B 33/10

[52] U.S. Cl. ........................... 340/825.25; 340/825.72; 369/24; 381/25; 455/88; 455/100

[58] Field of Search ...................... 340/825.25, 825.69, 340/825.72; 455/66, 88, 100, 351, 45, 70, 159.1; 379/63; 381/25, 98, 104, 105; 359/184, 189; 369/24, 32, 33

[56] References Cited

U.S. PATENT DOCUMENTS

| | | | |
|---|---|---|---|
| 2,892,039 | 6/1959 | Greisman | 369/24 |
| 3,647,985 | 3/1972 | Langendorf et al. | 369/24 |
| 3,980,832 | 9/1976 | Nakamura et al. | 455/159.1 |
| 4,281,217 | 7/1981 | Dolby | 455/70 |
| 4,397,947 | 4/1983 | Warner | 455/45 |
| 4,728,949 | 3/1988 | Platte et al. | 340/825.69 |
| 4,746,919 | 5/1988 | Reitmeier | 340/825.72 |
| 4,789,973 | 12/1988 | Mabuchi | 369/24 |
| 4,825,209 | 4/1989 | Sasaki et al. | 340/825.72 |
| 4,845,751 | 7/1989 | Schwab | 381/25 |
| 5,007,050 | 4/1991 | Kasparian et al. | 455/88 |

FOREIGN PATENT DOCUMENTS

| | | |
|---|---|---|
| 55-38647 | 3/1980 | Japan . |
| 57-44276 | 3/1982 | Japan . |
| 60-203080 | 10/1985 | Japan . |
| 1-149525 | 6/1989 | Japan . |
| 3-41650 | 2/1991 | Japan . |

Primary Examiner—Donald J. Yusko
Assistant Examiner—Andrew M. Hill
Attorney, Agent, or Firm—Lewis H. Eslinger; Jay H. Maioli

[57] ABSTRACT

A signal reproducing apparatus operating on a wireless basis and having a status signal multiplexed with audio signals and transmitted to a receiver containing a display, the status signal indicating the current operating status of a recording medium player. On receiving the status signal, the display indicates the current operating status of the recording medium player so that the user may accordingly control the player from a distance without the intervention of wires.

4 Claims, 4 Drawing Sheets

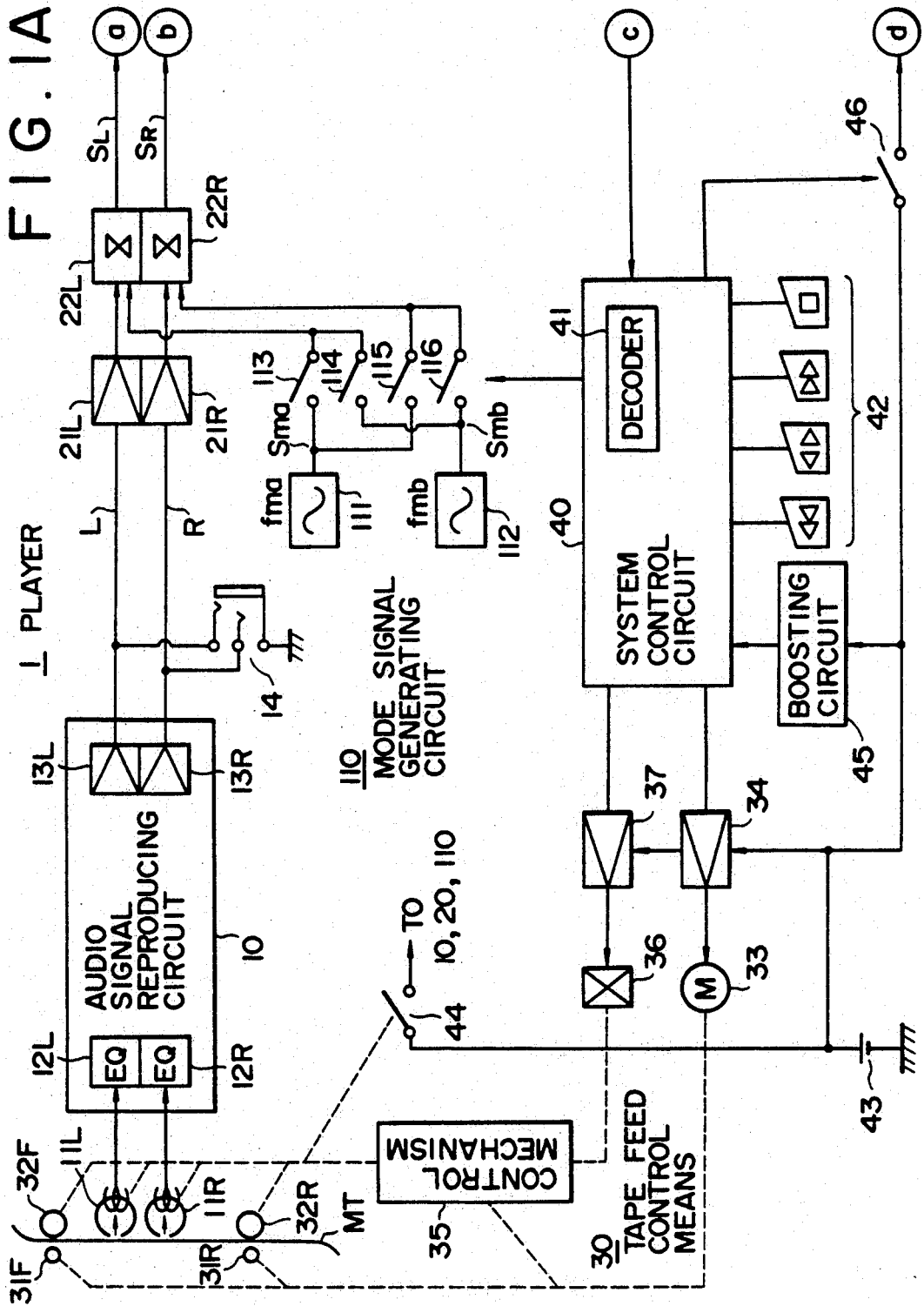

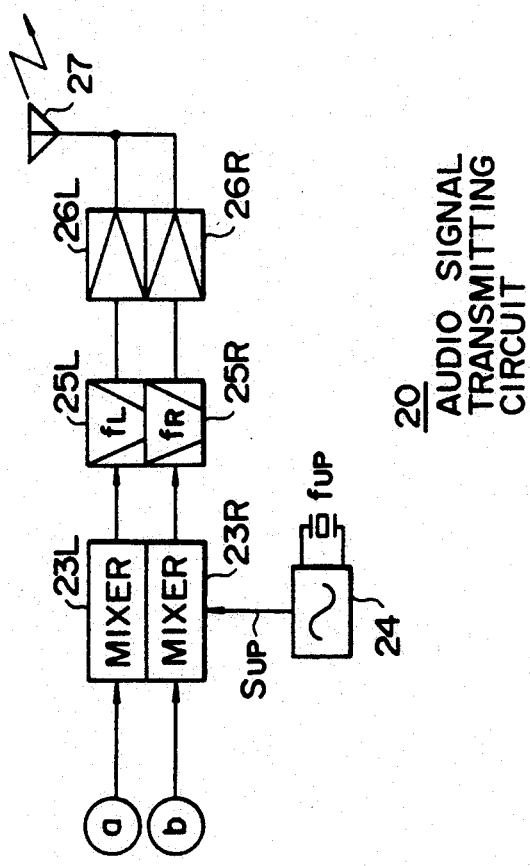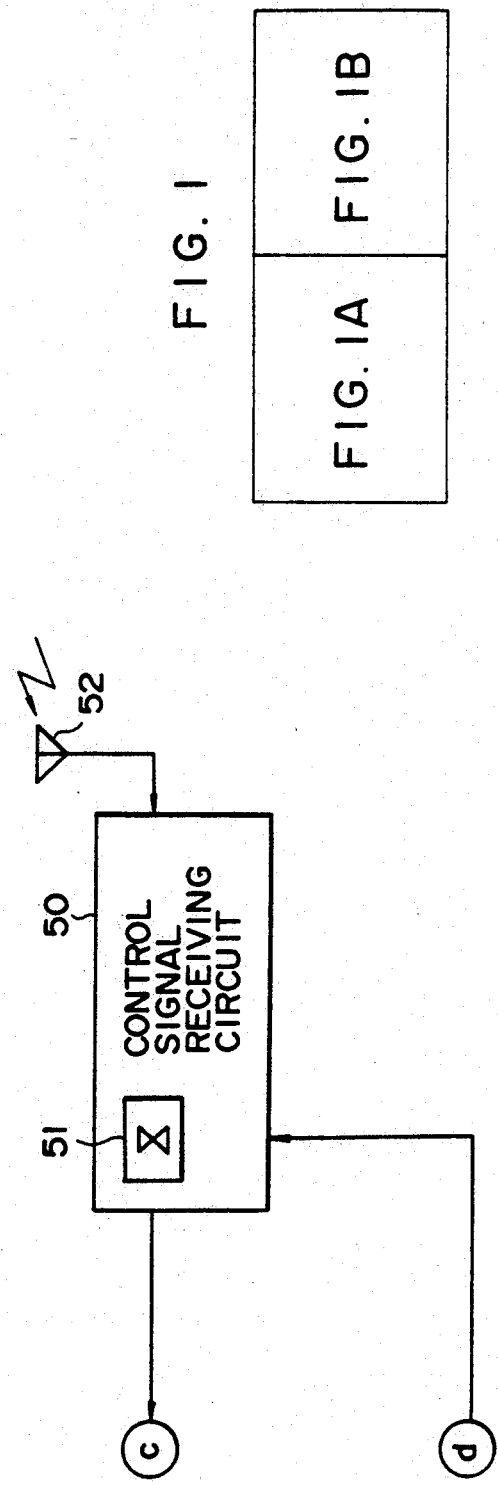

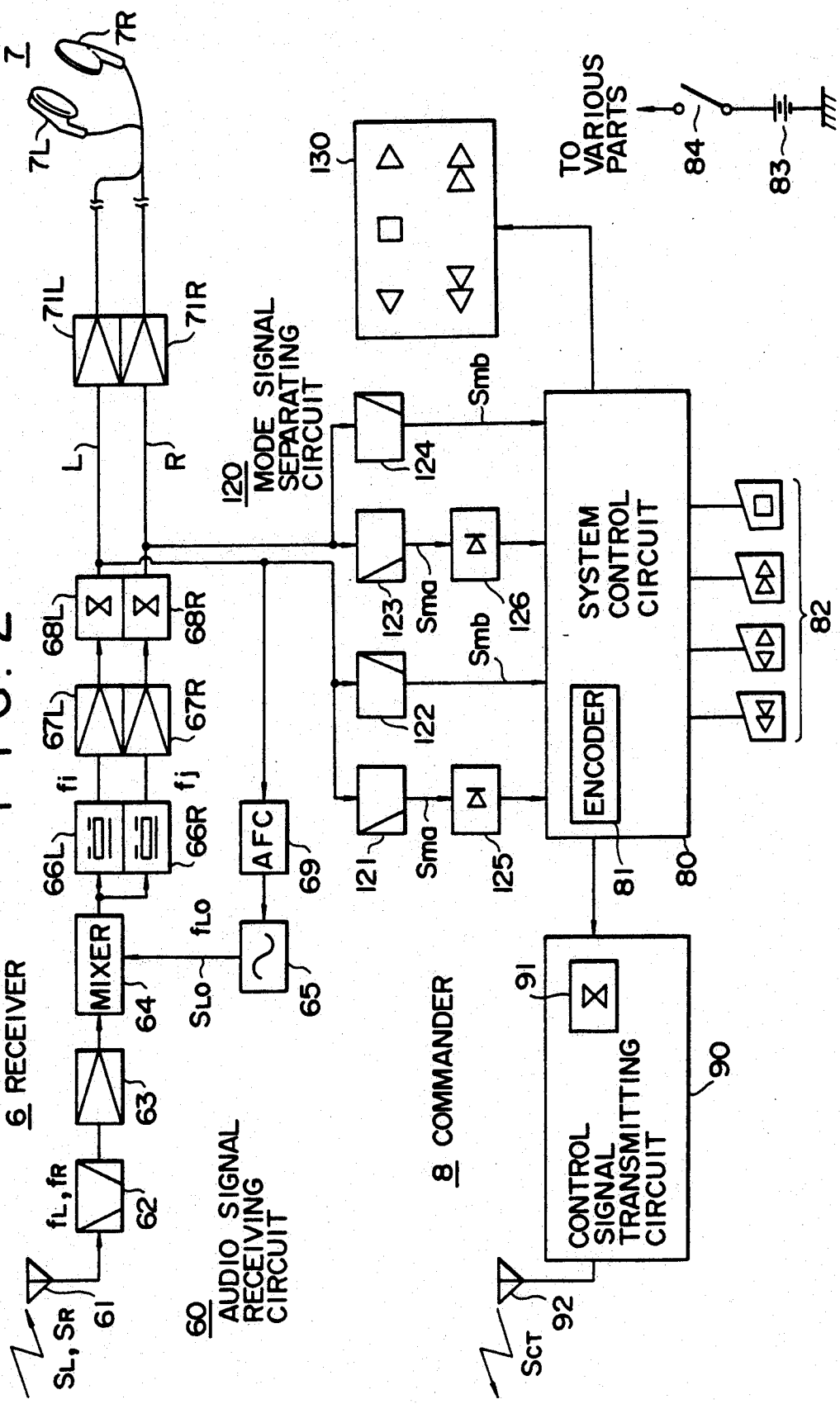

SIGNAL REPRODUCING APPARATUS

BACKGROUND OF THE INVENTION

1. Field of the Invention

The present invention relates to a wireless type signal reproducing apparatus.

A signal reproducing apparatus embodying the invention comprises a recording medium player, an audio signal receiver and a remote controller. The audio signal receiver receives audio signals from the recording medium player; the remote controller is attached to the audio signal receiver to provide remote control over the recording medium player. A status signal indicating the current operating status of the recording medium player is multiplexed with the audio signals for transmission to the audio signal receiver, containing a display means. The status signal causes the display means to display the current operating status of the recording medium player so that the recording medium player will be controlled from a distance in accordance with the current operating status thereof.

2. Description of the Prior Art

One type of the Walkman (registered trade name) stereo headphone cassette player (simply called the player hereunder) or the like has been known to operate on a wireless transmission method involving wireless signal transmissions between the player proper and its headphones.

FIG. 3 is a perspective view of a typical wireless player of the above-described type. In the figure, reference numeral 1 is a player, and 6 is a dedicated receiver with headphones.

In the player 1, left-hand and right-hand channel stereo audio signals L and R are reproduced from a cassette tape, not shown. The signals L and R are converted to FM signals SL and SR on two carriers which are a predetermined frequency apart. After conversion, the signals SL and SR are transmitted to the receiver 6.

On receiving the FM signals SL and SR from the player 1, the receiver 6 demodulates these signals and recovers the audio signals L and R therefrom. The signals L and R are supplied respectively to acoustic units 7L and 7R on the left-hand and right-hand side of the headphones 7.

In the above setup, the receiver 6 may measure as small as 2.5 cm wide, 8 cm high and 1.5 cm thick, or even less.

To operate the apparatus, the user puts the player 1 in his briefcase or in her handbag, and places the receiver 6 in the breast pocket or clips it on to a lapel or to the necktie. In this manner, the user on, say, a commuter train may reproduce a desired cassette tape without being bothered by a headphone cord.

The receiver 6 operates within a 1.5-meter radius of the player 1. The operative distance is restricted so as to comply with relevant wireless telegraphy regulations and to provide against interference if another user operates the same type of apparatus nearby. Apparatuses of this type are disclosed in Japanese Patent Application No. 61-254966 (Japanese Patent Laid-Open No. 63-108825) and Japanese Patent Application No. 62-280489 (Japanese Patent Laid-Open No. 1-122223).

With the above-described wireless type apparatus, the player 1 in operation is usually separated from the headphones 7 (hence the wireless scheme). One disadvantage of this conventional apparatus is that it is bothersome to operate controls on the player 1 to switch its operation mode, particularly when the player 1 is placed deep in the briefcase or in the handbag.

To overcome the above disadvantage, this applicant proposed a remote controller disclosed in Japanese Patent Application No. 1-177404. This remote controller involves having the headphone set equipped with a commander (operating unit) that is used to transmit coded control signals to the player for control over the operation mode thereof.

One remaining disadvantage of the proposed remote controller is that it is difficult for the user to know the current operation mode of the player, especially the tape running direction.

For example, when it is desired to reproduce a tape part considerably distant from the currently reproduced tape part, the user operates the commander to feed forward or rewind the tape at high speed until the desired part is reached. But because it is impossible immediately to verify the direction in which the tape is currently running, there is a possibility that the tape will be fed fast in the wrong direction.

SUMMARY OF THE INVENTION

It is therefore an object of the present invention to provide a wireless type signal reproducing apparatus controlled by a radio signal from a distance in accordance with the current operating status of the player contained therein.

In carrying out the invention, and according to one aspect thereof, there is provided a wireless type signal reproducing apparatus comprising (in reference to FIGS. 1 and 2): a reproducing section 1 for reproducing audio signals from a recording medium (magnetic tape); a transmitting section 20 for transmitting the audio signals from the reproducing section 1; an audio signal receiving section 6 for receiving the audio signals from the transmitting section 20; a remote control section 8, attached to the audio signal receiving section 6, for providing remote control over the reproducing section 1; and a control signal receiving section 50 for receiving control signals from the remote control section 8. Additionally reproducing section 1 contains a status signal generating means 110 for generating a status signal indicating the current operating status of the reproducing section 1, the status signal being multiplexed with the audio signals for transmission. Also, the audio signal receiving section 6 contains a display means 130 for displaying the current operating status of the reproducing section in accordance with the transmitted status signal.

The setup above allows the user to know the current operating status of the reproducing section which in turn may be controlled accordingly from a distance.

BRIEF DESCRIPTION OF THE DRAWINGS

FIG. 1 shows the association between FIGS. 1A and 1B;

FIGS. 1A and 1B depict a block diagram showing major components of a wireless type signal reproducing apparatus as a preferred embodiment of the invention;

FIG. 2 is a block diagram depicting the other major components of the embodiment.

DESCRIPTION OF THE PREFERRED EMBODIMENT

Figure 3:
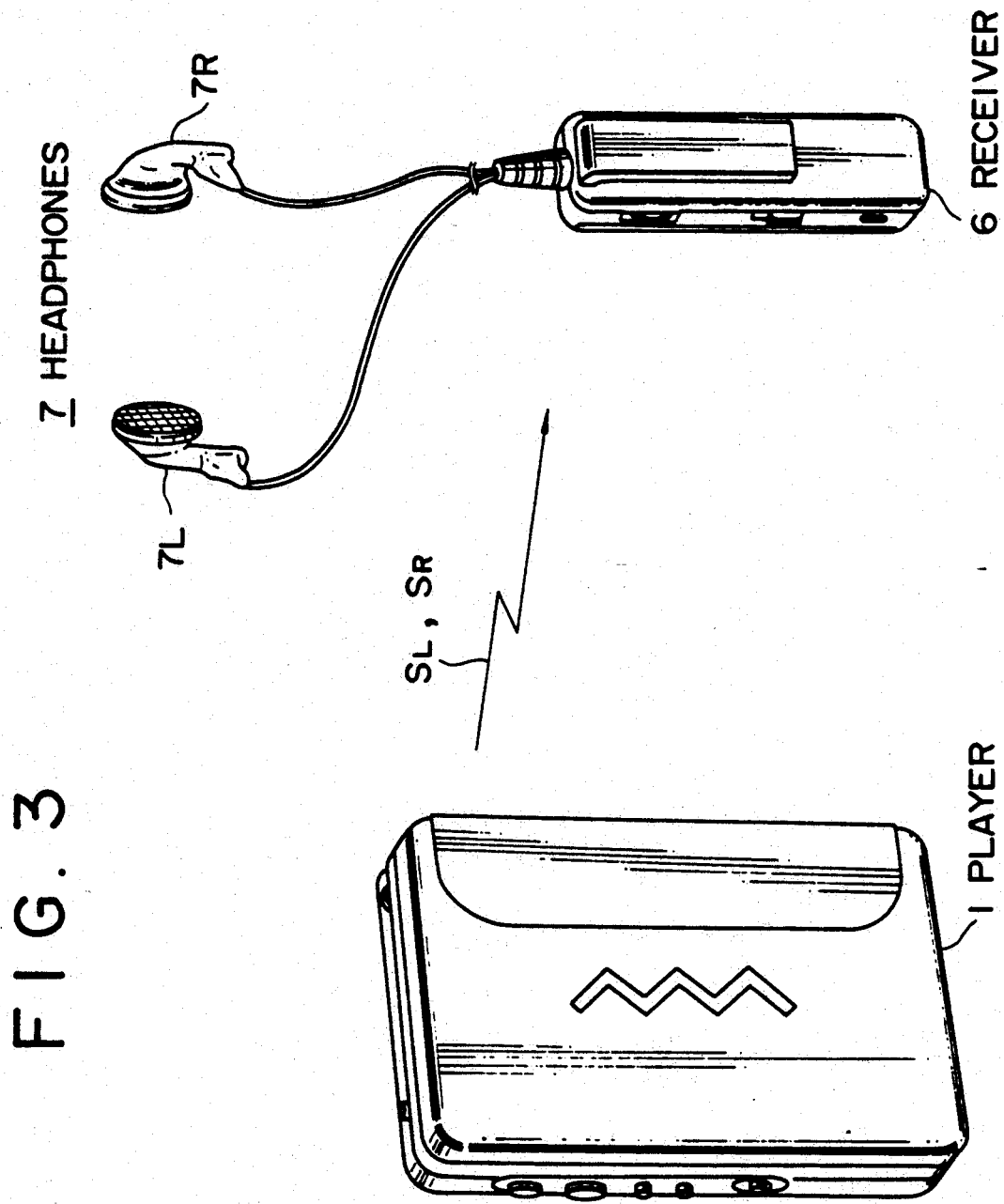
FIG. 3 is a perspective view of a typical wireless type signal reproducing apparatus shown for explanatory purposes in connection with the invention.

One preferred embodiment of the present invention will now be described with reference to FIGS. 1 and 2.

FIGS. 1 and 2 are block diagrams depicting the constitution of the wireless type signal reproducing apparatus embodying the invention.

Specifically, FIGS. 1 and 2 illustrate a player 1 and a receiver 6, respectively, in terms of their components; the player and the receiver constituting the embodiment. The receiver 6 is equipped with an operating section (commander) 8 for remote control.

The player 1 comprises an audio signal reproducing circuit 10, an audio signal transmitting circuit 20, a system control circuit (microcomputer) 40 and a control signal receiving circuit 50. The receiver 6 contains an audio signal receiving circuit 60, a system control circuit (microcomputer) 80 and a control signal transmitting circuit 90.

The player 1 further comprises a mode signal generating circuit 110 that generates a mode signal indicating the current operation mode thereof. The receiver 6 further contains a mode signal separating circuit 120 and an LCD indicator 130, the latter displaying the current operation mode of the player 1.

Below is a description of how the embodiment works in terms of audio signal and control signal transmission on a wireless basis.

In the player 1 of FIG. 1, left-hand and right-hand channel audio signals are reproduced from a tape MT by magnetic heads 11L and 11R, respectively. The left-hand and right-hand channel audio signals are then supplied to equalizing amplifiers 12L and 12R, respectively. Output audio signals L and R from amplifiers 13L and 13R are sent to a headphone jack 14. At the same time, the signals L and R are fed past amplifiers 21L and 21R of the audio signal transmitting circuit 20 and are supplied to frequency modulators 22L and 22R. In turn, the frequency modulators 22L and 22R generate a pair of FM signals SL and SR, respectively.

With this embodiment, original carrier frequencies fl and fr are illustratively set as low as fl = 12.67 MHz
fr = 12.21 MHz These frequencies are mixed by mixers 23L and 23R with an output signal $S_{UP}$ from an oscillator 24 having a frequency of $f_{UP}$ = 88.67 MHz Upon receipt of the mixed frequencies from the mixers 23L and 23R, band pass filters 25L and 25R produce carrier frequencies fL and fR illustratively set as high as fL = 76.00 MHz
fR = 76.46 MHz The FM signals SL and SR with the above frequencies are then fed past high-frequency amplifiers 26L and 26R and transmitted from an antenna 27.

In a tape feed control means 30, a motor 33 coupled with capstans 31F and 31R is controlled by a system control circuit 40 via an amplifier 34. A control mechanism 35 utilizes the torque of the motor 33 to control the mechanical status of the player 1. The system control circuit 40 also controls the control mechanism 35 via a plunger 36 and an amplifier 37.

The system control circuit 40 has a remote control decoder 41 that decodes the output of the control signal receiving circuit 50. The operating status of the player 1 is controlled on the basis of a control signal output by the decoder 41 or on a control signal from operating keys 42 on the player side.

A power supply battery 43 is illustratively a secondary battery with a voltage of 1.2 V and a capacity of 600 mHA. The battery 43 directly powers the amplifiers 34 and 37 of the tape feed control means 30. The power of the battery 43 is also supplied via a switch 44 to the audio signal reproducing circuit 10 and the audio signal transmitting circuit 20. The battery 43 powers the system circuit 40 and the control signal receiving circuit 50 through a boosting circuit 45 and a switch 46. The switch 46 is controlled by the system control circuit 40.

In the receiver 6 of FIG. 2, the FM signals SL and SR from the player 1 are received by an antenna 61. The signals are sent past a band pass filter (tuning circuit) 62 and a high-frequency amplifier 63 and are fed to a mixer 64. The mixer 64 mixes the FM signals SL and SR with an output signal $S_{LO}$ from a local oscillator 65. The frequency $f_{LO}$ of the signal $S_{LO}$ is illustratively set as $f_{LO}$ = 65.76 MHz The FM signals SL and SR are converted to intermediate frequency signals whose frequencies fi and fj are illustratively set as fi = 10.24 MHz
fj = 10.70 MHz These intermediate frequency signals are fed respectively through intermediate frequency filters 66L and 66R as well as amplifiers 67L and 67R and into frequency demodulators 68L and 68R. The frequency demodulators 68L and 68R demodulate the FM signals respectively and recover the audio signals L and R therefrom. The audio signals L and R are supplied to the headphones 7 via amplifiers 71L and 71R.

The output of the frequency demodulator 68L is supplied to an AFC voltage forming circuit 69. An AFC voltage from the circuit 69 is fed to the local oscillator 65.

The system control circuit 80 for remote control has an encoder 81 that codes a control signal coming from operating keys 82. The coded control signal is transmitted by a transmitting circuit 90 in frequency modulated format. The carrier frequency fCT of the FM signal $S_{CT}$ is illustratively set as fCT = 88.67 MHz The voltage of the battery 83 on the side of the receiver 6 is illustratively three volts. Unlike the player 1, the receiver 6 has no need for boosting circuits.

Below is a description of how a mode signal is transmitted and how mode displays are provided in the embodiment. A mode signal generating circuit 110 on the side of the player 1 has two mode signal generators 111 and 112. The frequency $f_{ma}$ of one mode signal generator 111 is higher than the audio frequency band, and the frequency $f_{mb}$ of the other mode signal generator 112 is lower than the audio frequency band. Illustratively, these frequencies are set as $f_{ma}$ = 40 kHz
$f_{mb}$ = 10 Hz Mode signals Sma and Smb output by the generators 111 and 112 are fed respectively past switches 113 and 115 as well as switches 114 and 116 and into the frequency modulators 22L and 22R of the audio signal transmitting circuit 20. The mode signals Sma and Smb are multiplexed by the frequency modulators 22L and 22R together with the left-hand and right-hand channel audio signals L and R before being transmitted.

With this embodiment, the system control circuit 40 controls the four switches 113-116 in accordance with the current operation mode of the player 1. In each operation mode, as shown in Table 1 below, one of the mode signals Sma and Smb is output over either the left-hand channel Lch or the right-hand channel Rch.

In stop mode, neither of the mode signals Sma and Smb is transmitted because the switch 44 of the player 1 is opened.

TABLE 1

| Mode | | Signal | | | |
|---|---|---|---|---|---|
| | | Sma | | Smb | |
| | | Lch | Rch | Lch | Rch |
| Reproduction | Forward | ○ | — | — | — |
| | Reverse | — | ○ | — | — |
| Fast-forward | Forward | — | — | ○ | — |
| | Reverse | — | ○ | ○ | — |
| Fast-rewind | Forward | ○ | — | — | ○ |
| | Reverse | — | — | — | ○ |
| Stop | | — | — | — | — |

On the side of the receiver 6, the mode signals Sma and Smb demodulated respectively by the frequency demodulators 68L and 68R in the audio signal receiving circuit 60 are separated from the left-hand and right-hand channel audio signals L and R by high-pass filters 121 and 123 as well as by low-pass filters 122 and 124 in the mode signal separating circuit 120. The high-frequency mode signal Sma is supplied through detectors 125 and 126 to the system control circuit 80.

The system control circuit 80 determines the operation mode of the player 1 based on the combination of the received mode signal Sma or Smb with the left-hand or right-hand channel on which the signal is transmitted. A control signal representing the operation mode thus determined is supplied to the LCD indicator 130. In turn, the LCD indicator 130 selects and displays one of the symbols illustrated.

Taking a look at the display, the user can readily ascertain the current operation mode of the player 1 which is located away from the receiver 6. Accordingly, the user may carry out necessary remote control operations regarding the player 1.

The LCD indicator may alternatively be replaced with an LED display.

As described, the wireless type signal reproducing apparatus according to the invention has an operating status signal multiplexed with audio signals and transmitted to the receiver containing the display means, the status signal indicating the current operating status of the player. On receiving the status signal, the display means indicates the current operating status of the receiver. This allows the user to control the player accordingly from a distance without the intervention of wires.

As many apparently different embodiments of the present invention may be made without departing from the spirit and scope thereof, it is to be understood that the invention is not limited to the specific embodiments thereof except as defined in the appended claims.

What is claimed is:

1. A signal reproducing apparatus producing audio signals for listening by a user on a wireless basis, said apparatus comprising:
 a reproducing section for reproducing audio signals in the form of left-hand and right-hand audio channels from a recording medium including
 mode signal generating means for generating mode signals indicating a current operating mode of said reproducing section including
 first and second signal generators each producing a respective output signal and switch means receiving output signals from said first and second signal generators for selectively providing said mode signals for injection into said left-hand audio channel and said right-hand audio channel and
 modulating means for modulating said mode signals from said switch means onto said audio channels;
 a transmitting section connected to said reproducing section for transmitting on a wireless basis said modulated audio and mode signals from said reproducing section;
 an audio signal receiving section remotely located from said reproducing section for receiving said transmitted modulated audio and mode signals from said transmitting section and including display means for displaying a current operating mode of said reproducing section in accordance with said transmitted mode signals;
 earphones electrically connected to said audio signal receiving section for producing said audio signals for listening by the user;
 a remote control section, attached to and connected with said audio signal receiving section, including a plurality of keys actuatable by a user for selecting an operating mode of said reproducing section by transmitting remote control signals to said reproducing section; and
 a control signal receiving section included with said reproducing section for receiving said remote control signals from said remote control section and feeding said control signals to said mode signal generating means and to said reproducing section for controlling said reproducing section in accordance therewith.

2. The signal reproducing apparatus of claim 1, wherein said transmitting section includes a local oscillator producing a local oscillation signal and further including a left-hand channel mixer and a right-hand channel mixer for combining said local oscillation signal with said left-hand audio channel and said right-hand audio channel from said modulating means.

3. The signal reproducing apparatus of claim 2, wherein said local oscillator has a frequency of 88.67 MHz.

4. The signal reproducing apparatus of claim 1, wherein said first signal generator is adapted to produce an output signal with a frequency higher than the audio frequency band, and said second signal generator is adapted to produce an output signal with a frequency lower than the audio frequency band.

* * * * *